(12) United States Patent
Rickenbach (10) Patent No.: US 7,196,320 B1
(45) Date of Patent: Mar. 27, 2007

(54) FIBER OPTIC ENCODER FOR POSITION SENSING

(76) Inventor: Robert Rickenbach, 1068 Calle Rey, Thousand Oaks, CA (US) 91360

( * ) Notice: Subject to any disclaimer, the term of this patent is extended or adjusted under 35 U.S.C. 154(b) by 0 days.

(21) Appl. No.: 11/079,696

(22) Filed: Mar. 14, 2005

(51) Int. Cl.
G01D 5/34 (2006.01)
H01J 40/14 (2006.01)
H01J 5/16 (2006.01)
G01J 1/34 (2006.01)

(52) U.S. Cl. ............ 250/231.14; 250/226; 250/227.21; 33/1 PT; 341/13

(58) Field of Classification Search ........... 250/231.13, 250/231.14, 231.18, 226, 227.21, 227.23; 356/614–618, 450; 341/11, 13; 33/1 PT
See application file for complete search history.

(56) References Cited

U.S. PATENT DOCUMENTS

| | | | |
|---|---|---|---|
| 4,546,466 A | 10/1985 | Lopiccolo | |
| 4,652,747 A | 3/1987 | Ellis | |
| 4,654,523 A | 3/1987 | Tanaka et al. | |
| 4,713,541 A | 12/1987 | Renaud et al. | |
| 4,719,346 A | 1/1988 | Taillebois et al. | |
| 4,739,163 A | 4/1988 | Gambs et al. | |
| 4,740,688 A | 4/1988 | Edwards | |
| 4,761,551 A | 8/1988 | Edwards et al. | |
| 4,761,777 A | 8/1988 | Edwards et al. | |
| 4,769,537 A | 9/1988 | Taillebois et al. | |
| 4,774,494 A | 9/1988 | Extance et al. | |
| 4,833,317 A | 5/1989 | Huggins | |
| 4,849,624 A | 7/1989 | Huggins | |
| 4,874,245 A | 10/1989 | Spillman, Jr. et al. | |
| 4,931,636 A | 6/1990 | Huggins | |
| 4,958,072 A | 9/1990 | Hofler et al. | |
| 4,964,727 A * | 10/1990 | Huggins ..................... | 356/617 |
| 4,999,489 A | 3/1991 | Huggins | |
| 5,029,987 A | 7/1991 | Shinomiya | |
| 5,036,192 A | 7/1991 | Ishizuka et al. | |
| 5,038,032 A | 8/1991 | Nishimura et al. | |
| 5,051,579 A | 9/1991 | Tsukiji et al. | |
| 5,068,528 A | 11/1991 | Miller et al. | |
| 5,073,710 A * | 12/1991 | Takagi et al. ........... | 250/231.14 |
| 5,073,711 A | 12/1991 | Brininstool et al. | |
| 5,129,725 A | 7/1992 | Ishizuka et al. | |
| 5,198,873 A | 3/1993 | Ishizuka et al. | |
| 5,223,708 A | 6/1993 | Van Deventer | |
| 5,276,323 A | 1/1994 | Nakaho | |
| 5,424,535 A | 6/1995 | Albion et al. | |
| 5,650,612 A | 7/1997 | Criswell et al. | |
| 5,818,221 A | 10/1998 | Baruch | |
| 6,043,483 A | 3/2000 | Schreiber | |

(Continued)

Primary Examiner—Stephone B. Allen
Assistant Examiner—Patrick J. Lee
(74) Attorney, Agent, or Firm—Jack C. Munro; Sandy Lipkin (57) ABSTRACT

A passive all fiber optic encoder that will be able to determine speed, position, and direction of movement of a movable object. The all passive encoder utilizes no electronics within the sensing part and therefore is deployable in harsh environments, electrical, electromagnetic and radiation fields, otherwise not possible with conventional electronic encoders. The system utilizes a multiwavelength light source and one optical fiber leading to the encoder sensor housing which has a shutter, a light filter assembly and reflective mirror. The movement of the shutter produces a sequential series of light impulses sequenced proportional to the movement of the shutter. The light filter assembly utilizes a minimum of two different filters each of which passes or rejects light within a certain space and wavelength range.

18 Claims, 4 Drawing Sheets

U.S. PATENT DOCUMENTS 6,407,378 B1  6/2002  Sakaguchi
6,534,762 B1  3/2003  Kieselbach et al.
6,610,975 B2 *  8/2003  Ito et al. ................ 250/231.16
6,654,128 B2  11/2003  Takayama et al.

* cited by examiner

FIBER OPTIC ENCODER FOR POSITION SENSING

BACKGROUND OF THE INVENTION

1. Field of the Invention

The subject matter of the present invention will be discussed primarily in conjunction with use of a rotating shaft in conjunction with some form of machinery to determine speed, position and direction of movement of the shaft. However, it is considered to be within the scope of this invention that this invention could be utilized to determine speed, position and direction of movement of a lineally moving object.

2. Description of the Related Art

A rotating shaft within machinery is frequently connected with an encoder. Encoders are commonly used to sense the motion of pulleys on top of cable car towers, ski lifts, gondolas, etc. Also, encoders are used in conjunction with numerous manufacturing facilities, such as chemical plants or gasoline refineries. It is common for encoders to incorporate an electronic circuit that senses rotation of a graduated disc. The graduated disc takes the form of a rotating wheel that includes a series of evenly spaced apart openings. The electronic circuit works in conjunction with a computer to count each time the graduated disc permits light to be conducted through one of the openings and then to be blocked and then the light to be again projected through another opening, and so forth. The electronics in this manner is able to determine the position of the shaft and count the revolutions of the shaft.

These electronic devices are subject to interference to nearby electrical or electronic transmission equipment. This interference can result in the producing of an incorrect pulse which will get counted and therefor the computer will assume an erroneous position of a rotating shaft. Also, these electronics when used in harsh environments are subject to inoperability and the producing of erroneous counts. For example, encoders utilized in conjunction with ski lifts are subject to lightening strikes. Electronic encoders that are also installed in conjunction with explosive atmospheres within chemical plants or refineries are subject to causing explosions or igniting flammable materials or gases.

Prior art encoders sense angular motion by using a photodetector to detect light from a light source that typically is a light emitting diode (LED). The light from the LED is transmitted through a graduated glass disc which comprises a disc that has a mass of spaced apart openings. Each time as the disc is moved and the light is projected through an opening and then is prevented from being transmitted by the structure of a secondary static mask, a single count is produced. By counting of the sequential arrangement of the projection of the light versus the non-projection of the light, a position of a shaft can be ascertained as well as the number of revolutions that has occurred of the shaft. Encoders of the prior art are also able to determine the direction of rotation of the rotating shaft. The primary disadvantage of all prior art encoders is that such must have electronics immediately adjacent to the rotating disc and these electronics when exposed to a harsh environment subjects the encoder to inoperability or incorrect operation.

Another harsh environment for an optical encoder is when it is used in conjunction with a brake system of a vehicle wheel. Temperatures and vibrations near these wheels can be extreme and standard electronics will not provide reliability. Electrical and electromagnetic fields will also interfere with the internal electronics and/or the wiring leading to the encoder.

SUMMARY OF THE INVENTION

A first basic embodiment of optical encoder of this invention comprises a light source and a light detector connected to one end of an elongated optical fiber. The light source is to transmit light into the optical fiber and the detector is for receiving light from the optical fiber. A shutter, that has a mass of separated openings, is located directly adjacent the opposite end of the optical fiber. The opposite end is to emit light with the shutter functioning to prevent passage of the light through the openings or blocking light by the structure of the shutter. The shutter is movable relative to the optical fiber in coordination with a movable object. A mirror is mounted exteriorly of the shutter. The mirror functions to reflect light that has been transmitted through the openings back through the openings to be transmitted by the optical fiber to the detector. A light filter assembly is mounted between the shutter and the mirror with the light filter assembly being spaced from the mirror or on the mirror itself. The light filter assembly is constructed of a plurality of light filters with the light filters permitting transmission of only a specific wavelength range of light whereby the detector is not only able to count each time the light is blocked by the shutter and then transmitted by the shutter but also determine the direction of movement of the shutter by noting which wavelength of light is being received first by the detector and which is being received second.

A further embodiment of the present invention is where the first basic embodiment is modified by defining that the shutter constitutes a rotating wheel.

A further embodiment of the present invention is where the just previous embodiment is modified by stating that the spaced apart openings formed within the shutter comprise slits.

A further embodiment of the present invention is where the first basic embodiment is modified by defining that the mirror is curved.

A further embodiment of the present invention is where the just previous embodiment is modified by defining that the mirror is spherical.

A further embodiment of the present invention is where the first basic embodiment is modified by defining that the light filter assembly divides the area of light transmission from the mirror into two equal areas.

A second basic embodiment of the present invention is directed to an optical encoder to be used in conjunction with a rotatable shaft which utilizes a light source and a light detector connected to one end of an elongated optical fiber. The light source is for transmitting light into the optical fiber and the detector is for receiving light from the optical fiber. A shutter, in the form of a rotating wheel or linear array of slits that has a mass of slits, is located directly adjacent an opposite end of the optical fiber. This opposite end is to emit and capture light. The shutter functions to permit passage of the light through the openings or blocking of the light by the structure of the shutter. The shutter is movable relative to the optical fiber in coordination with the movable object. A spherical mirror is mounted exteriorly of the shutter with the mirror functioning to reflect light that has been transmitted through the openings, back through the openings to be transmitted by the optical fiber to the detector. A light filter assembly is mounted between the shutter and the mirror with the light filter assembly being spaced from the mirror. The light filter assembly is constructed of a plurality of light filters with each light filter permitting transmission of only a specific wavelength of light whereby the remote detector is not only able to count each time the light is blocked by the shutter and then transmitted by the shutter but also determine direction of movement of the shutter by noting which wavelength of light is being received first by the detector and which is received second.

A further embodiment of the present invention is where the second basic embodiment is modified by stating that the light filter assembly divides the area of light transmission from the mirror into two equal areas.

A third basic embodiment of the present invention is directed to an optical encoder that is to be used in conjunction with a movable object which utilizes an optical source with an appreciable wide bandwidth, such as an LED or dual peak laser, or a combination of two or more LEDs or lasers for transmitting light into one end of an optical fiber with the optical fiber having an opposite end from which light is to be projected in a light beam. A light collecting device is positioned to receive the light beam. A shutter is positioned between the opposite end with the light collecting device located transversely across the light beam. The shutter is movable to permit the light to be projected to the light collecting device or to prevent the light to be projected to the light collecting device. A filter assembly is mounted transverse to the light beam and located between the shutter and the light collecting device. The filter assembly is constructed of a first filter and a second filter. The first filter is to transmit light only in a first wavelength range and the second filter is to only transmit light in a second wavelength range whereby the light collecting device is not only able to count each time light is blocked by the shutter and then transmitted by the shutter but also determine the direction of the movement of the shutter by noting which wavelength of light is being received first by the light collecting device and which is received second.

A further embodiment of the present invention is where the third basic embodiment is modified by defining that the first filter of the filter assembly transmits light only within the range of 700 nm (nanometers) to 900 nm.

A further embodiment of the present invention is where the just previous embodiment is modified by stating that the second filter of the filter assembly is only to transmit light within the range of 1100 nm to 1400 nm.

A further embodiment of the present invention is where the third basic embodiment is modified by defining that the shutter comprises a rotating wheel.

A further embodiment of the present invention is where the just previous embodiment is modified by defining that the rotating wheel has a mass of slits.

A further embodiment of the present invention is where the third basic embodiment is modified by defining that the filter assembly divides the overall area of light transmission of the light beam into two equal subareas.

A fourth basic embodiment of the present invention comprises a method of ascertaining position, speed and direction of movement of a rotating shaft comprising the steps of projecting a light source onto one end of an elongated optical fiber the light of which is transmitted by the fiber to an opposite end where it is projected in a light beam, projecting the light beam onto a shutter which has a mass of openings, moving the shutter causing the light beam to be projected through an opening of the openings and by further movement of the shutter causing blocking of the light beam by the structure of the shutter, projecting the light beam onto a filter assembly which causes the light beam to be separated to a pair of wavelength ranges, and projecting from the filter assembly the light beam onto a curved mirror to reflect the light beam back to the optical fiber and the light is then guided by the optical fiber to a detector which ascertains rotating speed, direction of rotation and position of the rotating shaft.

A further embodiment of the present invention is where the just previous embodiment is modified by the using of a spherically shaped reflecting surface on the mirror.

A further embodiment of the present invention is where the fourth basic embodiment is modified by using of a rotating disc as the shutter.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 3b is a view similar to FIG. 3a but showing the reflection of light only occurring within the range of about 850 nm where both FIGS. 3a and 3b show the utilizing of a spherical mirror to achieve the reflection of the light back to the optical fiber.

DETAILED DESCRIPTION OF THE INVENTION

Figure 1:
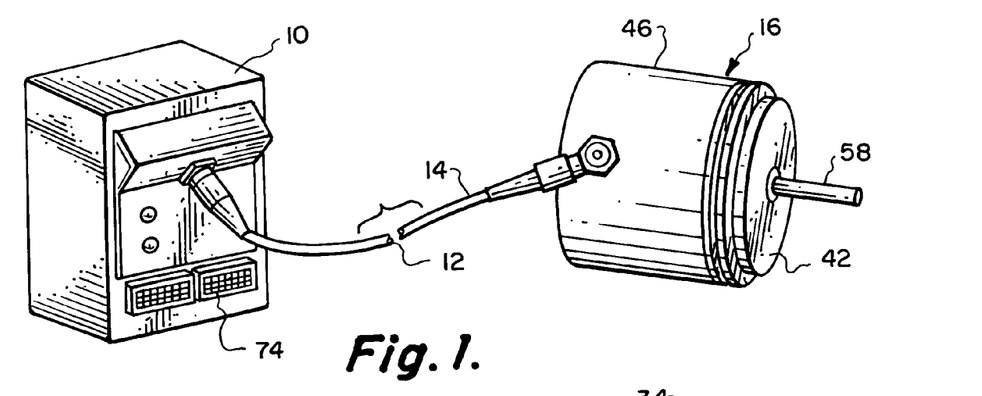
FIG. 1 is an exterior perspective view of the optical encoder system of the present invention.
Figure 2:
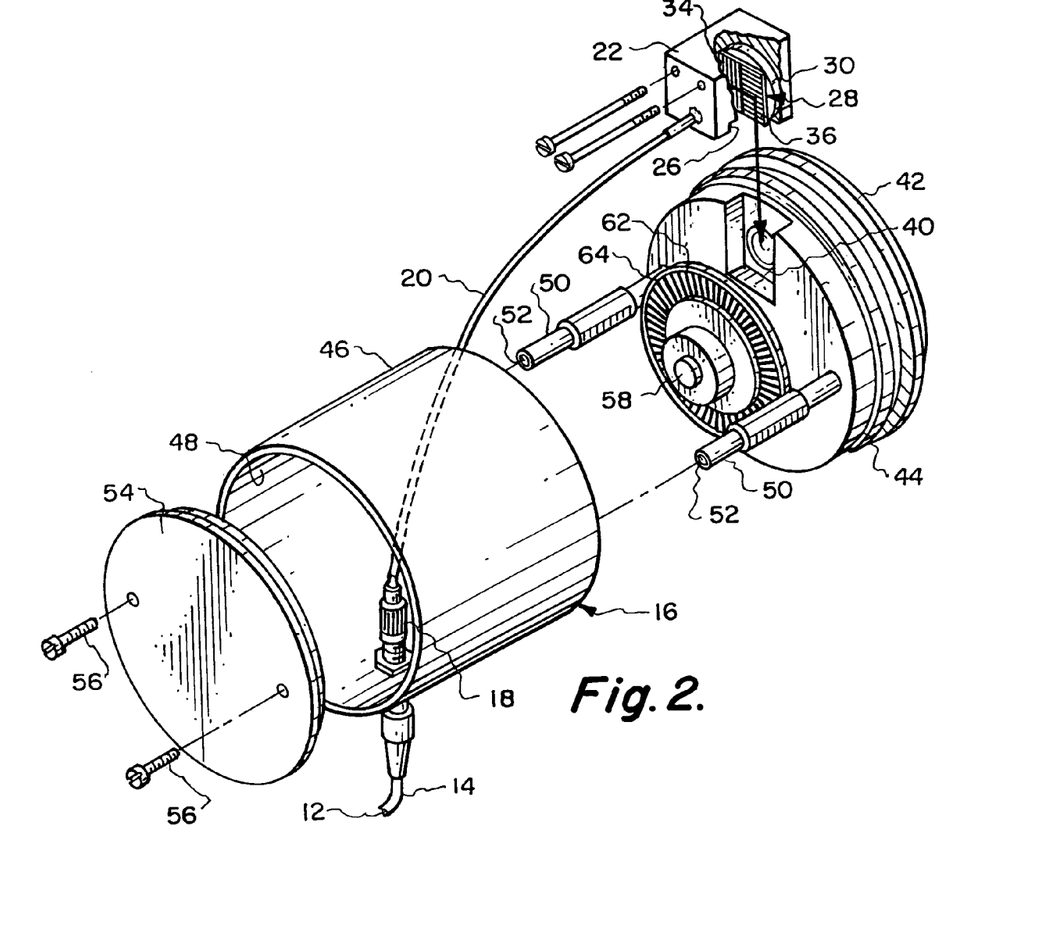
FIG. 2 is an exploded perspective view of a portion of the optical encoder of the present invention that includes the shutter, mirror and light filter assembly.

In FIG. 1, there is a remote encoder interface box (REIB) 10 within which is mounted a light source, which is not specifically shown, and a detector, which is again not specifically shown. The light source emits at two distinct wavelengths 850 nm and 1300 nm. The light source may be comprised of two LEDs (light emitting diodes), two lasers, or incandescent light bulb or any other type of light source capable of emitting at more than one wavelength. The light source is to transmit light into an optical fiber 12 which is mounted within a flexible cable 14. The optical fiber 12 is deemed to be conventional and is composed of a core and a cladding made from glass. The cable 14 is mounted to an encoder housing 16. This mounting is achieved by a connector 18. The coupler 18 receives the transmitted light from the optical fiber 12 and transmits such to within internal connecting optical fiber 20. The connecting optical fiber 20 is mounted within a mounting block 22. From the mounting block 22 the light is emitted in the form of a conical light beam 24. The light beam 24 is transmitted within space 26 that is formed within the block 22. Mounted within the block 22 is a filter assembly 28. There also may be mounted within the block 22, in a fixed position, a curved mirror 30. The mirror 30 has an arcuate reflecting surface 32. Typically, the reflecting surface 32 will be spherical. It is to be noted that the filter assembly 28 is planar and is located in front of the surface 32 and spaced therefrom. The filter assembly 28 comprises an optical element that selectively passes incident light that comes from the fiber 20. The filter assembly 28 can be made of glass, metal or plastic or a combination of such. The filter assembly 28 is composed of a first filter 34 and a second filter 36. Both the first filter 34 and the second filter 36 have selective transmission with respect to the wavelength of light. Basically, the first filter 34 blocks all light except light that has a wavelength in the range of 700–900 nm. Maximum transmission of light is preferred in the 850 nm range. The second filter 36 reflects pretty much all the light except light in the wavelength range of 1100–1400 nm with it being preferred that maximum transmission in the area around 1300 nm is to occur. It is to be noted that the filter assembly 28 is shown mounted against the side edges of the mirror 30. Even though the filter assembly 28 can be mounted against the mirror 30, it is to be noted that the filter assembly 28 is actually spaced from the reflective surface 32. The close proximity spacing of the filter assembly 28 to the reflective surface 32 will result in the maximum transmission of the desired wavelength of light for the particular filter. It is to be noted that the light beam 24 will strike the filter assembly 28 producing an overall area which will be in the shape of a circle. In essence, the first filter 34 and the second filter 36 will divide this overall area in half producing two equal subareas. This dividing in half is caused by center diameter joint 38.

The mounting block 22 is mounted within a recess 40 of a base 42 which is part of the encoder housing 16. The base 42 is basically disc shaped and has mounted around its periphery an O-ring seal 44. A cylindrically shaped cover 46 is to be slipped onto the periphery of the base 42 and tightly engage such in an airtight, liquid tight manner with the seal 44. The coupler 18 is mounted directly to the cover 46 and is located within the confines of the internal chamber 48 of the cover 46. Secured to the base 42 are a pair of pins 50. Each pin 50 has an internally threaded opening 52. The outer open end of the cover 46 is to be closeable by a cap 54. The cap 54 is to have conducted there through a pair of screw fasteners 56. Each screw fastener 56 is to be threadable engaged with a single opening 52. This will result in forming of a single secured together unit composed of the cap 54, cover 46 and the base 42.

Figure 3A:
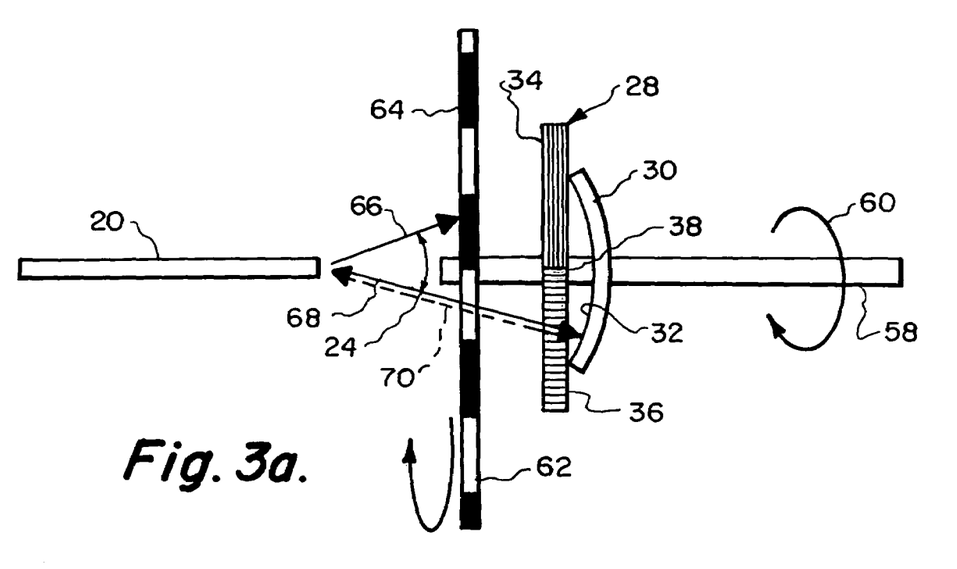
FIG. 3a is a diagrammatic view depicting the operation of the optical encoder of the present invention to depict generally the reflection of light at the approximate wavelength of 1300 nm.

Longitudinally, centrally mounted within the base 42 is a shaft 58. The shaft 58 is capable of rotational movement as depicted by arrow 60 in FIGS. 3a and 3b. Fixedly mounted on the shaft 58 is a shutter 62. The shutter 62 is in the shape of a disc that is going to rotate with the shaft 58, hence a rotating disc. The shutter 62 includes a mass of openings 64 in the form of slits. Typically, there will be about two-hundred fifty-six of the slits annularly located on the shutter 62. The shutter 62 extends within the space 26 of the mounting block 22. As a result, the openings 64 cut across the light beam 24 as it is being projected toward the filter assembly 28. The result is, as shown in FIG. 3a, that the transmitted light is substantially blocked by the shutter 62 that would be projected toward the first filter 34. However, the light from the light beam 24 is projected, as indicated by arrow 68, through one of the openings or slits 64 and onto the second filter 36. The light that passes through the second filter 36 is reflected back by the reflective spherical surface 32 in the direction of arrow 70. This reflected light will then be picked up by the core of the connecting optical fiber 20 and then guided inside the optical fiber 12 back to the (REIB) 10.

Figure 3B:
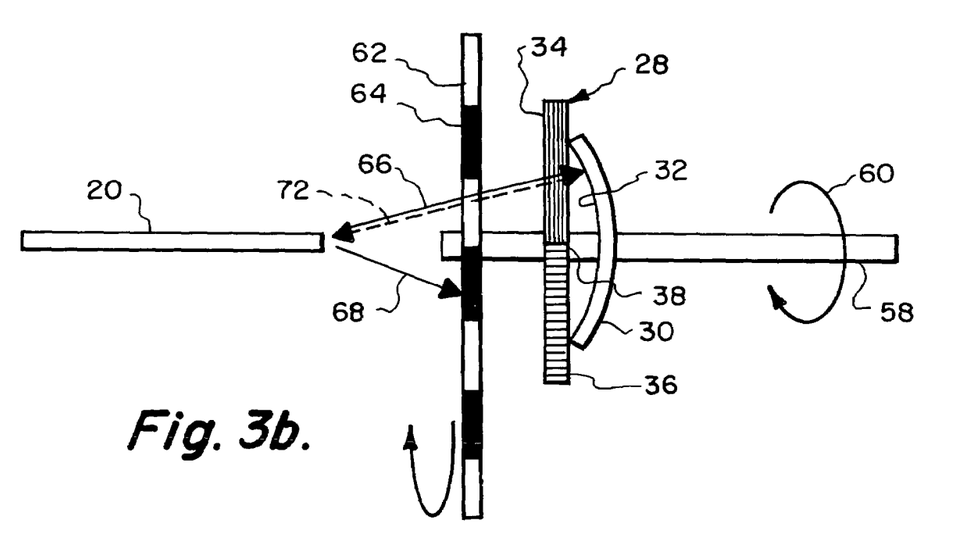

Within the housing (Remote Encoded Encoder Interface Box) (REIB) is the optical receiver and appropriate electronics that make up the detector. The optical receiver may be comprised of two individual optical detectors each having an optical filter permitting transmission of only one preferred wavelength band of either 850 nm or 1300 nm. Each optical detector converts the optical power received within its specific wavelength band into a proportional electrical current. Subsequent electronics will amplify the electrical current and convert it to an electrical voltage having the characteristic of the received optical power levels. Further electronics will convert the analog voltage into a dual A and B channel digital signal capable of driving a servo or PLC controller or other electrical equipment. The construction of such detectors is deemed to be conventional. The detector will note that light within the 850 nm spectrum is being returned but light within the 1300 nm spectrum is not being returned. However, when the shutter 62 is moved angularly about 0.7 degrees, the incident light represented by arrow 68 will now be blocked and instead the incident light represented by 66 is permitted to pass through an opening 64 through the first filter 34 to be projected against the spherical surface 32 and then reflected back through the filter 34, as indicated by arrow 72. This reflected light is then picked up by the core of the connecting optical fiber 20 and transmitted back via the cable 12 to the detector located in the (REIB) 10. The detector now notes that 1300 nm light is being returned and 850 nm light is not. The result is the electronics can make the determination to count approximately 0.7 degrees of a revolution of the shaft 58 and also to note that the shaft 58 is spinning in one direction, such as clockwise. Included within the housing 10 is a numerical readout display 74. The numerical readout display 74 will display numerically the position of the shaft 58, and as the shutter 62 is turned clockwise, the numerical value will appropriately increase. If the shutter 62 is turned counterclockwise, this numerical value will decrease. If the shutter 62 reaches a zero point position further movement in the counterclockwise direction of the shutter 62 will result in the production of a negative numerical value in the display 74.

As the shutter 62 is turned, it will sequentially block the 850 nm wavelength light and then sequentially block the 1300 nm light. This later blocking of the 1300 nm light as opposed to the 850 nm light is read by the electronics as the shaft is turning clockwise. Also, since there is a zero position that is accorded to the shaft, movement away from that zero position will be to inform the user the position of the shaft. The openings in the shutter 62 will ultimately allow the optical signal to pass to the mirror 30 and to be reflected back by the reflective surface 32 into the fiber 20. Because the light emanates cone shaped from the fiber 20 and the reflective surface 32 reflects the optical power in the spatial orientation back to the fiber 20, there is a measurable time difference from when the optical power is started to being blocked until the entire light cone of the light beam 24 is being blocked from the reflecting surface 32. There is an equal time difference from when the opening 64 will let the light beam pass through to the mirror 30 until all the light is passed and reflected back to the optical fiber 20.

Figure 4:
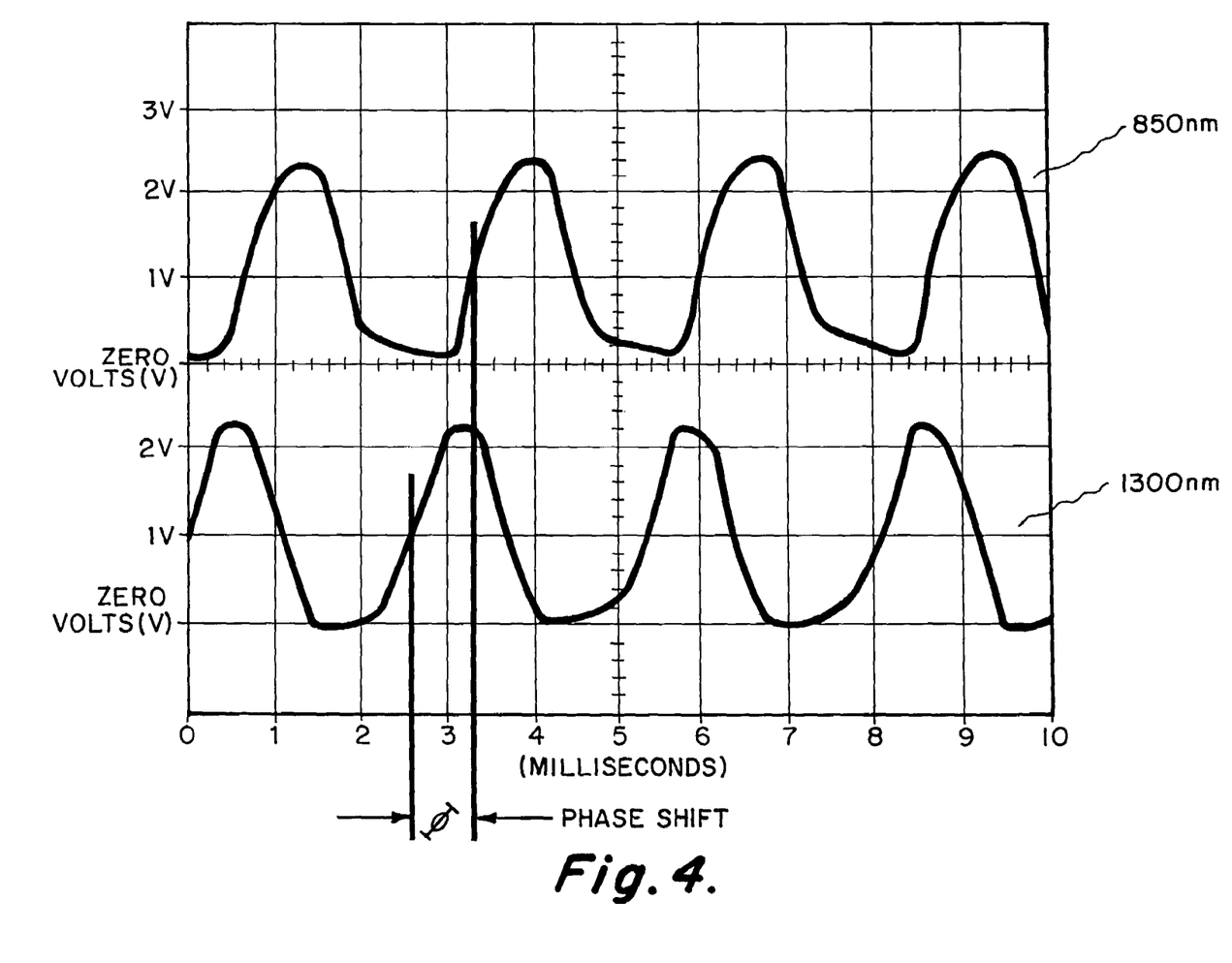
FIG. 4 shows a graphical representation of electrical signal graphs which are equivalent to each power level (850 nm and 1300 nm).

FIG. 4 shows how direction of the turning wheel can be ascertained from the two optical signals received by the detector. Signal curve 1300 nm is leading the signal 850 nm by a given phase shift $\phi$. When in FIG. 3a, beam 68 passes through the opening 64 of the shutter 62 then the signal strength of signal 1300 nm in FIG. 4 increases. At the same time, beam 66 is blocked but then gradually increases in strength as the shutter 62 moves forward. Subsequently connected electronics, not part of this invention, utilizes this phase shift φ to determine in which direction the shutter 62 is turning.

Figure 5:
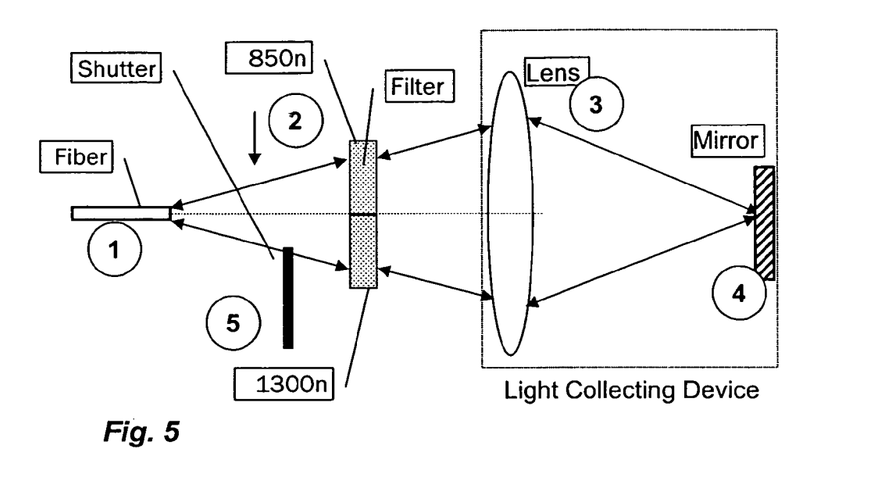
FIG. 5 shows an implementation of the light collecting device using a lens and reflective surface for collecting and reflecting the light beam back to the optical fiber.

FIG. 5 shows a light collection device in which the light beam emanated from the optical fiber 1 expands in a conical fashion before reaching an imaging lens 3. The collecting lens focuses the light beam onto a mirrored surface 4 where the light is being reflected and transmitted back through the lens 3 onto the optical fiber 1. Between the optical fiber and the lens is located a filter assembly 2 having two spatially separated wavelength regions. This filter assembly is of the same type as described in FIG. 3 item 28. Located anywhere between the fiber 1 and filter assembly 2 is the movable shutter 5 which interrupts the light beam as it moves past the light beam.

Figure 6:
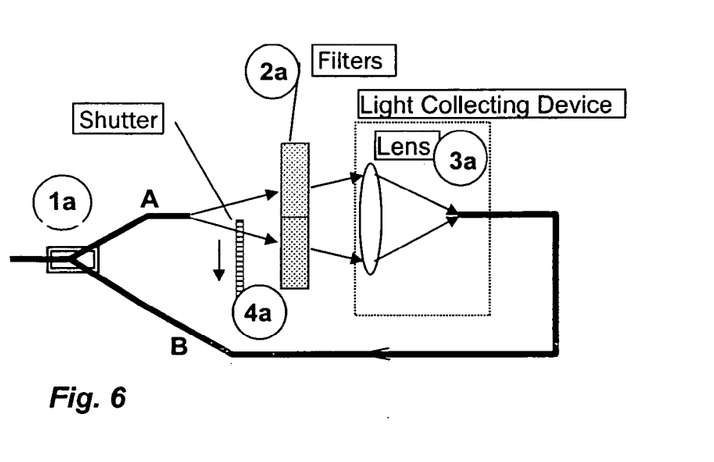
FIG. 6 shows an implementation of the light collecting device using a fiber optic splitter/coupler assembly to send the light to a lens and collecting said light back into the optical fiber.

FIG. 6 shows a light collection device in which a fiber optic coupler 1a is used to recombine the light being sent back to the fiber where it originated. Portion A of the light beam emanated from the optical fiber splitter expands in a conical fashion before reaching an imaging lens 3a. The collecting lens focuses the light beam onto the fiber optic end B of the fiber splitter and recombines the light so that 1a is guided back the same fiber where it originated from. Between the optical fiber and the lens is located a filter assembly 2a having two spatially separated wavelength regions. This filter assembly is of the same type as described in FIG. 3 item 28. Located anywhere between the shutter, the filter, the lens and the movable shutter 4a interrupts the light beam as it moves past the light beam.

It is considered to be within the scope of this invention that instead of using two different wavelengths produced by the filter assembly 28 that it would be possible to use the effect of polarization where instead of the filter assembly 28 the S and P planes of polarization would be used. It would be necessary to use polarization preserving fiber to make this arrangement practically feasible. Alternatively, the spherical mirror 30, though preferred, could be instead a parabolic mirror or some other arcuate shape, or could possibly comprise a lens plus a flat mirror.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be added for the device described, but also a method claim is added to address the method of making the invention. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. An optical encoder adapted to be used with a movable object comprising:
   a light source and a light detector connected at one end of an elongated optical fiber, said light source for transmitting light into said optical fiber, said detector for receiving light from said optical fiber;
   a shutter that has a mass of opaque slits and a mass of transparent slits, said shutter located directly adjacent an opposite end of said optical fiber, said opposite end to emit light, said shutter functioning to permit passage of said light through said transparent slits or blocking light by said opaque slits, said shutter being movable relative to said optical fiber in coordination with the movable object;
   a mirror mounted exteriorly of said shutter, said mirror functioning to reflect light that has been transmitted through said transparent slits back through said transparent slits to be transmitted by said optical fibers to said detector; and
   a light filter assembly mounted between said shutter and said mirror, said light filter assembly being constructed of a plurality of light filters with each light filter of said light filters permitting transmission of only a specific wavelength range of light, whereby said detector is not only able to count each time light is blocked by said shutter and then transmitted by said shutter but also determine position of the movable object and direction of movement of said shutter by noting which wavelength of light is being received first by said detector and which is received second.

2. The optical encoder as defined in claim 1 wherein: said shutter comprising a rotating wheel.

3. The optical encoder as defined in claim 2 wherein: said separated openings comprising slits.

4. The optical encoder as defined in claim 1 wherein: said mirror being arcuate.

5. The optical encoder as defined in claim 4 wherein: said mirror being spherical.

6. The optical encoder as defined in claim 1 wherein: said light filter assembly divides overall area of light transmission from said mirror into two substantially equal sized subareas.

7. An optical encoder to be used to ascertain position and speed of a rotatable shaft and to count revolutions of the rotatable shaft and also determine the direction of rotation of the rotatable shaft comprising:
   a light source and a light detector connected to an elongated optical fiber, said light source for transmitting light into said optical fiber, said detector for receiving light from said optical fiber;

a shutter that is fixedly mounted to said rotatable shaft, said shutter comprising a wheel that includes a mass of opaque slits and a mass of transparent slits, said shutter being located directly adjacent an opposite end of said optical fiber, said opposite end to emit light, said shutter functioning to permit passage of said light through said transparent slits or blocking light by said opaque slits, said shutter being movable relative to said optical fiber in coordination with said rotatable shaft;

a mirror mounted exteriorly of said shutter, said mirror functioning to reflect light that has been transmitted back through said transparent slits to be transmitted by said optical fiber to said detector;

a light filter assembly mounted between said shutter and said mirror, said light filter assembly being spaced from said mirror, said light filter assembly being constructed of a plurality of light filters with each light filter permitting transmission of only a specific wavelength range of light, whereby said detector is not only able to count each time light is blocked by said shutter and then transmitted by said shutter from which a user is able to determine the number of revolutions of said rotatable shaft but also determine the position of said rotatable shaft and determine direction of rotation of said rotatable shaft by noting which wavelength of light is being received first by said detector and which is received second.

8. The optical encoder as defined in claim 7 wherein:
said mirror being spherically curved.

9. The optical encoder as defined in claim 7 wherein:
said light filter assembly divides overall area of light transmission from mirror into two equal subareas.

10. An optical encoder adapted to be used with a movable object comprising:
an optical source with an appreciable wide bandwidth, such as an LED or dual peak laser, or a combination of two or more LEDs or lasers for transmitting light into one end of an optical fiber, said optical fiber having an opposite end from which said light is to be projected in a light beam;

a light collecting device positioned to receive said light beam;

a shutter positioned between said opposite end and said light collecting device within said light beam, said shutter being movable to permit said light to be projected to said light collecting device or prevent said light to be projected to said light collecting device, said shutter being fixed to the movable object;

a filter assembly mounted transverse to said light beam and located between said shutter and said light collecting device, said filter assembly constructed of a first filter and a second filter, said light bream to be projected through said filter assembly, said first filter to only transmit light in a first wavelength range, said second filter to only to transmit light in a second wavelength range, whereby said light collecting device is not only able to count each time said light is blocked by said shutter and then transmitted by said shutter but also determine position of the movable object and determine direction of movement of said shutter by noting which wavelength of light is being received first by said light collecting device and which is received second.

11. The optical encoder as defined in claim 10 wherein:
said first wavelength range being within the range of 700 nm to 900 nm.

12. The optical encoder as defined in claim 11 wherein:
said second wavelength range being within the range of 1100 nm to 1400 nm.

13. The optical encoder as defined in claim 10 wherein:
said shutter comprising a rotating wheel which includes a mass of separated openings.

14. The optical encoder as defined in claim 13 wherein:
said openings comprising slits.

15. The optical encoder as defined in claim 10 wherein:
said filter assembly divides overall area of light transmission of said light beam into two substantially equal sized subareas.

16. A method of ascertaining position, speed and direction of movement of a rotating shaft comprising the steps of:
projecting a light source onto one end of an elongated optical fiber which is transmitted by the fiber to an opposite end where it is projected exteriorly of the fiber into a light beam;

projecting the light beam onto a shutter which includes a mass of openings;

moving the shutter causing the light beam to be projected through an opening of said openings and by further movement of said shutter causing blocking of the light beam by structure of said shutter;

projecting the light beam onto a filter assembly which causes the light beam to be confined to a pair of wavelength ranges;

projecting onto a mirror and reflecting the light beam back to the elongated optical fiber; and projecting from said filter assembly said light beam onto a detector which is able to ascertain rotating speed, direction of rotation and position of the rotating shaft.

17. The method as defined in claim 16 wherein said mirror is constructed to have a spherically shaped reflecting surface.

18. The method as defined in claim 16 where within the second projecting step includes utilizing a rotating disc as said shutter where said rotating disc includes a mass of slits as openings.

* * * * *